Patented Mar. 25, 1930

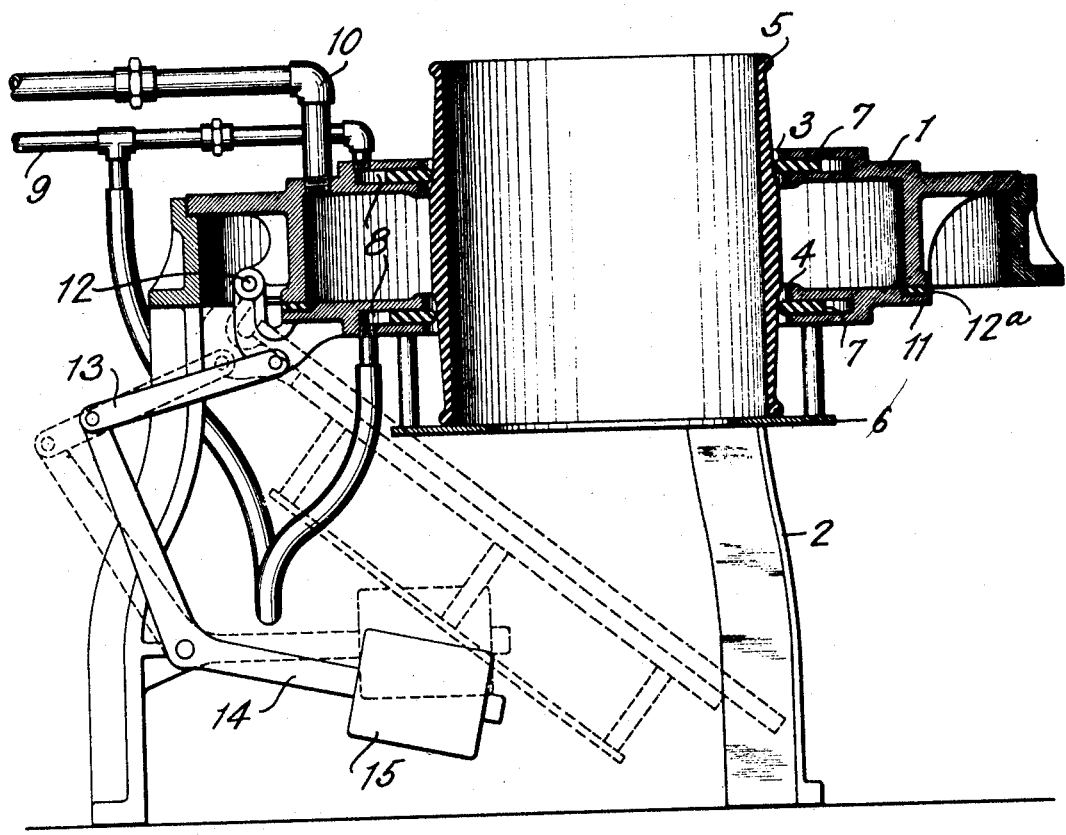

1,752,136

UNITED STATES PATENT OFFICE

ADRIAN O. ABBOTT, JR., OF DETROIT, MICHIGAN, ASSIGNOR TO MORGAN & WRIGHT, OF DETROIT, MICHIGAN, A CORPORATION OF MICHIGAN

APPARATUS FOR MANUFACTURING TIRES

Application filed March 27, 1929. Serial No. 350,238.

This invention relates to a device for shaping pulley bands into tire casings.

In the art of tire building as at present practiced the constituent elements of a tire are built up upon a drum thus forming a ring shaped assembly of the tire elements which is commonly known as the pulley band. This pulley band is shaped into a tire casing by any suitable means such as a vacuum box.

It is the object of this invention to provide a pulley band shaping device, or more specifically a vacuum box, in which the mechanism for removing the shaped tire casing from the box is novel. It is also the object of this invention to provide a tire shaping device having an automatically operated mechanism for permitting the removal of a shaped tire casing from the device. Another object of this invention is to provide a tire shaping device with mechanism for automatically opening the device to permit the removal of the shaped tire casing and also for automatically closing the device after the tire casing has been removed.

Other objects and advantages of the present invention will appear in the following detailed description when considered in connection with the accompanying drawings, in which:

The figure shows a section along one diameter of a vacuum box with parts in elevation.

The vacuum box consists of the hollow annular chamber 1 mounted upon a suitable supporting table 2. The annular chamber is provided with apertures 3 and 4 which permit the insertion of a pulley band 5 therewithin. A platform 6 depends from the lower side of the vacuum box and is adapted to support a pulley band in properly centered relation with respect to the annular chamber when the pulley band is first inserted in the vacuum box. Elastic rings 7 are mounted in slots 8 and the top and bottom sides of the annular chamber. The elastic rings 7 serve to effect a preliminary seal between the vacuum box and the pulley band so that when the air is evacuated from the annular chamber 1 reduced pressure will result. Suitable pipe connections as shown at 9 are provided for evacuating the slots 8 so that the elastic band 7 may be moved inwardly of the slots 8 to permit the insertion of the pulley band.

Pipe connections 10 connect the interior of the annular chamber 1 with a suitable evacuating means. The construction of the vacuum box insofar as described is a conventional one and many variations in the construction of the vacuum box may be made to which the present invention is applicable.

In practicing the present invention the bottom plate 11 of the annular chamber 1 is hinged, as shown at 12, to the side wall of the vacuum box. Suitable sealing means such as a rubber ring 12ª is monted around the margin of the bottom plate 11 to effect an air tight seal between the annular wall of the vacuum chamber 1 and the bottom plate 11. A weighted lever system consisting of the rod 13 pivoted on the hinge of the bottom plate 11 and the bell crank 14 pinned to the rod 13 and pivotally mounted upon the frame 2 is provided for counterbalancing the bottom plate 11. The weight 15 on one extremity of the bell crank 14 is adjustable to provide a suitable counterweight. The counter weight system normally holds the bottom plate 11 in closed position with respect to the chamber 1 of the vacuum box. The counterweight system preferably acts not only to hold the bottom plate 11 in position but also to support a pulley band thereon when the pulley band is first inserted in the vacuum box. Many counterweight systems and other force exerting devices such as springs and the like may be employed to effect the operation of the hingedly mounted bottom plate 11.

In the operation of the device a suitable source of suction acting through the pipe 9 draws the elastic rings 7 into the slots 8 thereby permitting the insertion of the pulley band 5. After the pulley band is inserted and allowed to rest upon the platform 6 the suction acting through pipe 9 is released so that the elastic rings 7 may contract into contact with the pulley band thereby effecting a seal therewith. Suction is then applied through the pipe connection 10 to the interior of the chamber 1 so that the atmospheric pressure acting on the interior of the pulley band may distort the same and cause it to be expanded and forced into the vacuum box thereby shaping the pulley band into the form of a tire casing. After the pulley band has been shaped into the form of a tire casing a curing bag is inserted therein.

When the pulley band is first inserted into the vacuum box the force exerted by the counterweight system is sufficient to maintain the bottom plate 11 in closed relation with respect to the vacuum box. After the vacuum has been applied to the interior of the chamber 1 it serves to maintain the plate 11 in its closed position and continues to so act when the curing bag is inserted within the tire casing. However, the force exerted by the counterweight system is not great enough to sustain the combined weight of the tire casing and the inserted curing bag so that upon opening pipe system 10 to the atmosphere, thereby bringing the pressure within the interior of the chamber 1 to atmospheric pressure, the combined weight of the tire casing and the inserted curing bag is sufficient to overcome the force exerted by the counterweight system thereby causing the bottom plate to swing about its pivot point 12 into the dotted line position shown in the figure. When the bottom plate assumes the position shown in dotted lines the tire casing and curing bag are free to slide off the bottom plate, to thus complete the operation of the vacuum box.

While it is preferred to have the counterweight system so adjusted to provide a force sufficient to support the pulley band when it is first inserted within the vacuum box, the device may be otherwise constructed. For instance the counterweight system may be adjusted to provide a force sufficient only to move the bottom plate 11 into closed relation with the vacuum box when it is free of any load, and a latch may be provided if desired to maintain the vacuum box in the bottom plate 11 in such position when the pulley band is inserted within the vacuum box. With such a modification the vacuum box may be opened and the inserted pulley band removed, after the interior of the vacuum box has been brought to atmospheric pressure, by simply manipulating the latch provided for maintaining the bottom plate 11 in closed relation with respect to the vacuum box.

While I have described certain embodiments of the present invention, it is obvious that various modifications may be made in the disclosed embodiment without departing from the spirit and scope of the invention and all such modifications are contemplated as part of the present invention as far as covered by the scope of the following claims.

Having thus described my invention what I claim and desire to protect by Letters Patent is:

1. In an apparatus for shaping tire casings and permitting curing bags to be assembled therein, a hollow annular chamber open on its inner periphery and having a movable lower wall, and means for creating less than atmospheric pressure within the chamber, in combination with means for governing the position of the movable lower wall, said means being automatically operated when the vacuum is broken to permit an assembled casing and bag to gravitate out of the chamber.

2. A tire shaping machine having in combination a casing constructed and arranged to expand pulley bands into tire shape, a movable member forming the lower portion of the casing, means for maintaining the movable member in a position to form the casing, said means being actuable to permit the removal of a shaped tire casing by gravitation.

3. A tire shaping device having in combination a casing open on the lower side, a cover plate adapted to close the open side of the casing, said casing and cover plate having apertures therethrough to accommodate a pulley band, a counterbalancing means adapted to support the plate in contact with the casing and adapted to permit the plate to lower and to open the casing under the combined weight of a tire casing and a curing bag.

4. A tire shaping device having in combination a casing open on the lower side, a cover plate adapted to close the open side of the casing, said casing and cover plate having apertures therethrough to accommodate a pulley band, means for opening the casing by lowering the cover plate whereby the formed tire may be removed by gravity.

5. A tire shaping device having in combination a casing open on the lower side, a cover plate adapted to close the open side of the casing, said casing and cover plate having apertures therethrough to accommodate a pulley band, a base plate attached to the cover plate for supporting the pulley band.

6. A tire shaping device having in combination a casing open on the lower side, a cover plate adapted to close the open side of the casing, said casing and cover plate having apertures therethrough to accommodate a pulley band, means for supporting the cover plate in position to form the casing, said means being adapted to permit the removal of the formed casing and an inserted curing bag by gravitation.

7. A vacuum box having in combination a hollow annular casing, the lower side thereof being movably mounted, said casing having apertures in the upper and lower sides to accommodate a pulley band, means for applying less than atmospheric pressure within the casing, and means for supporting the lower side in position to form a casing, said means being adapted to permit the removal of the formed casing and an inserted curing bag by gravitation.

8. A vacuum box having in combination a hollow annular casing, the lower side thereof being movably mounted, said casing having apertures in the upper and lower sides to accommodate a pulley band, means for applying less than atmospheric pressure within the casing, counterbalancing means arranged to support the lower side so as to form the casing, said counterbalancing means being adjusted so as to permit the lower side of the casing to open under the combined weight of a tire casing and a curing bag.

Signed at Detroit, county of Wayne, State of Michigan, this 22nd day of March, 1929.

ADRIAN O. ABBOTT, Jr.